Nov. 6, 1923.
J. J. JACOBS
GLARE SCREEN
Filed June 30, 1922
1,473,185
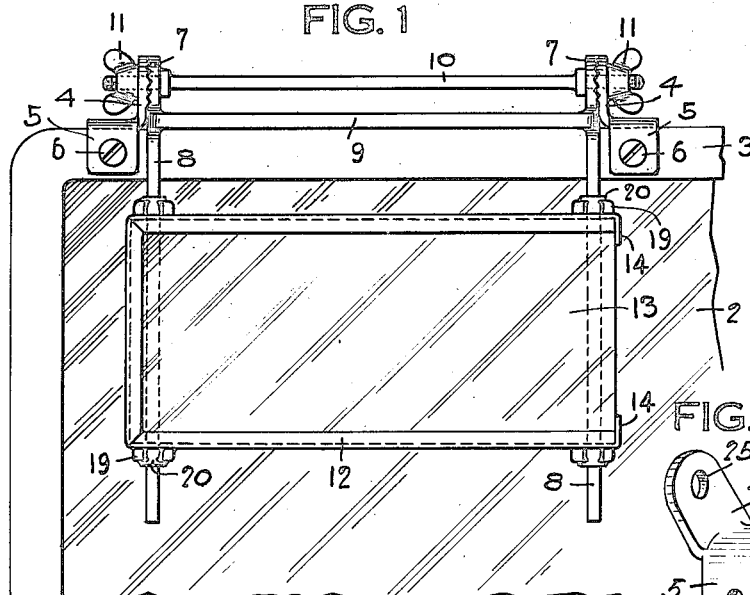
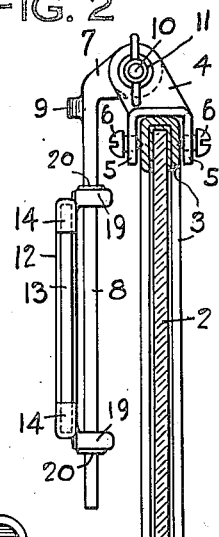
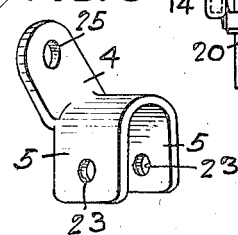
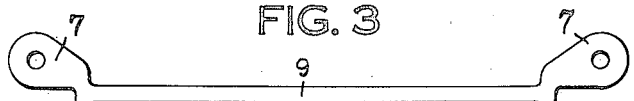
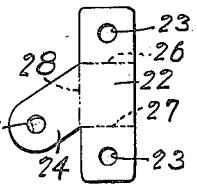
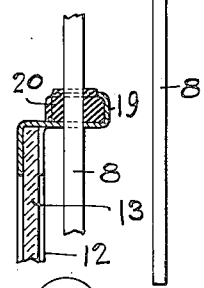
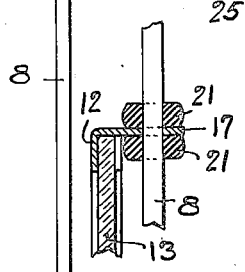
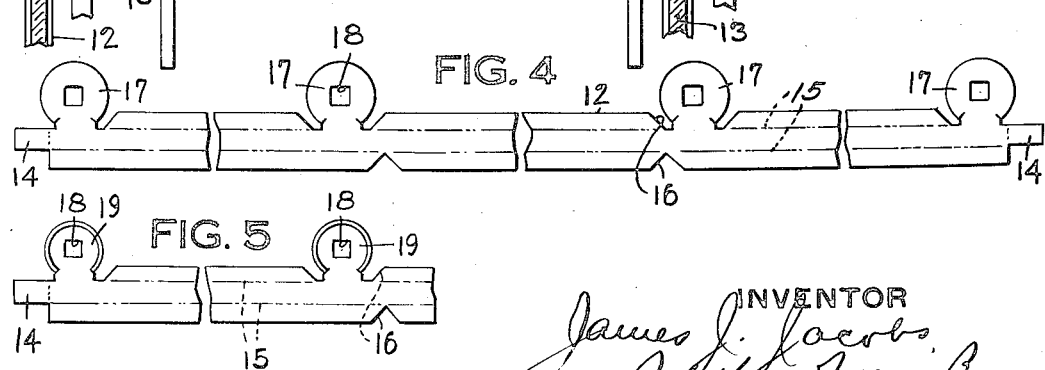
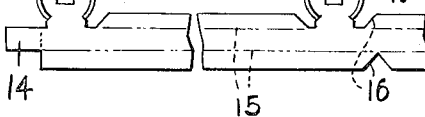
INVENTOR
James J. Jacobs.
By Kay, Totten Brown,
Attorneys Patented Nov. 6, 1923.

1,473,185

UNITED STATES PATENT OFFICE.

JAMES J. JACOBS, OF DUQUESNE, PENNSYLVANIA, ASSIGNOR OF ONE-FOURTH TO ROLLA B. BOSTWICK, ONE-FOURTH TO JOHN RING, AND ONE-FOURTH TO WILLIAM SALTERS, ALL OF DUQUESNE, PENNSYLVANIA.

GLARE SCREEN.

Application filed June 30, 1922. Serial No. 571,884.

*To all whom it may concern:*

Be it known that I, JAMES J. JACOBS, a citizen of the United States, and resident of Duquesne, in the county of Allegheny and State of Pennsylvania, have invented a new and useful Improvement in Glare Screens; and I do hereby declare the following to be a full, clear, and exact description thereof.

My invention relates to glare screens for attachment to the wind shields of automobiles and other vehicles for the purpose of intercepting the glare of approaching headlights.

One object of my invention is to provide a glare screen of simple and inexpensive construction which may be readily attached to any wind shield, and which may be adjusted in accordance with the height of the wind shield or the convenience of the driver.

Another object of my invention is to provide a glare screen composed of a minimum number of parts and preferably consisting mainly of simple and inexpensive stampings.

A further object of my invention is to provide an improved glare screen having means for firmly and adjustably holding a sheet of colored glass or other transparent material which, if broken, may be readily replaced.

In the accompanying drawing, Fig. 1 is a front elevational view of a portion of an automobile wind shield equipped with a glare screen constructed in accordance with my invention; Fig. 2 is a side elevational view as seen from the left of Fig. 1, the wind shield being shown in section; Fig. 3 is a somewhat enlarged plan view of the frame stamping; Fig. 4 is an enlarged plan view of portions of the slide frame stamping; Fig. 5 is a plan view of a portion of the slide frame stamping after a bending operation; Fig. 6 is a vertical sectional view showing one method of attaching the slide to the fixed frame; Fig. 7 is a vertical sectional view showing another method of attaching the slide to the fixed frame; Fig. 8 is a plan view of one of the lug stampings; and Fig. 9 is a perspective view of a modified form of lug.

My improved device consists in general of a three-sided sheet metal slide adapted to carry a sheet of colored glass or other transparent material, and mounted for sliding adjustment on a fixed frame consisting of two parallel arms rigidly connected by a third arm and provided with two integral bars which are secured for angular adjustment to two lugs which are fixed to the upper rail or the side rail of a wind shield of an automobile or truck. In the preferred construction shown in the drawing the lugs are attached to the ears of the fixed frame by means of a horizontal rod which extends the full width of the device, passes through registering openings in the ears and lugs, and is screw-threaded at its ends to receive wing-nuts which fasten the parts together at any desired angular position. The slide frame, the fixed frame and the lugs are each preferably made from a single stamping in the manner described below. The slide frame is adjustably secured to the vertical arms of the fixed frame, either by means of friction discs of rubber or other suitable material, or by means of set screws, and the slide frame is provided with fingers which may be bent to hold the transparent sheet in the frame, and may be readily bent back to release the transparent sheet when desired.

In the drawing the numeral 2 indicates an automobile wind shield having the usual frame 3. Secured to the upper rail 3 of the wind shield are two spaced lugs 4 each of which is provided with parallel sides 5 having openings to receive set screws 6 which firmly secure the lugs to the rail 3, and for this purpose are preferably pointed, as shown. The space between the sides 5 of the lugs may be made to fit either a rectangular wind-shield bar, as shown in Figs. 1 and 2, or may be curved to fit a curved bar, as shown in Fig. 9.

Between the lugs 4 are the ears 7 of a fixed frame having parallel vertical arms 8 connected by means of a horizontal bar 9. A horizontal rod 10 extends through registered openings in the ears 7 and the lugs 4, and is screw-threaded at its ends to receive wing nuts 11.

The meeting faces of the ears 7 and the lugs 4 are preferably corrugated as shown on Fig. 1, so that when the wing nuts 11 are tightened the fixed frame is firmly held at any desired angle.

Mounted for vertical sliding adjustment 1 on the parallel arms 8 is a three-sided slide frame 12 which carries a rectangular sheet 13 of colored glass or other transparent material which is secured in place by means of fingers 14 formed integral with the frame 12 and adapted to be bent into the position shown in Fig. 1, where they retain the sheet 13 in the frame, or to be bent outwardly to release the transparent sheet.

As stated above, the three main parts of the device, including the fixed frame, the slide frame, and the clamping lugs, are each preferably made from single stampings. The stamping from which the fixed frame is formed is shown on Fig. 3, where it will be seen that the parallel arms 8, the connecting bar 9, and the perforated ears 7 are stamped as a unit from sheet metal of proper thickness. The stamping dies may be so shaped as to make the arms 8 either square or round. As an alternative construction, the arms 8 with the ears 7 may be stamped in one piece, and the transverse bar 9 may be made separately and its ends later secured to the arms 8 by welding or upsetting.

Figs. 4 and 5 show the manner in which the slide frame 12 is stamped from a single piece of sheet metal. This stamping is made sufficiently wide so that when it is bent along the longitudinal lines 15 a channel will be formed of proper width to receive the sheet 13. At intervals corresponding to the corners of the slide frame, notches 16 are provided so that when this channel is bent the corners will meet neatly without overlapping. At these corner positions are integral lugs 17 provided with openings 18 which later receive the arms 8 of the fixed frame. These lugs may be formed into cups 19, as shown in Figs. 5 and 6, for the purpose of receiving friction discs 20 of rubber or other suitable friction material or, if desired, the lugs 17 may be left plain, as shown in Fig. 7, in which case friction discs 21 may be placed above and below the lugs 17 to hold the slide frame in position on the arms 8. The fingers 14 are formed integral with the slide frame strip, as shown in Fig. 4.

The stamping for the lugs 4 is shown in Fig. 8, and consists of a rectangular body portion 22, having openings 23 near its ends, and having an inclined portion 24 which later forms the lug 4 and which is provided with an opening 25. This stamping is bent along the three lines 26, 27 and 28, and then presents the appearance shown in Figs. 1 and 2. It will be observed that the lug 4 extends at an angle of about 45° with respect to the side portions 5, which brings the horizontal pivot of the glare screen inside of the plane of the wind shield. The glare screen is still further spaced inwardly from the wind shield by the ears 7, and sufficient space is thus produced between the screen and the wind shield to admit the usual wind shield wiper, and also to permit any desired adjustment of the wind shield or the glare screen. The screen does not interfere with swinging the wind shield inwardly or outwardly, and in wet weather the wind shield, or its upper section, may be swung out to act as a visor and the screen may then be adjusted to vertical position, where it serves both as a glare screen and as a protection against rain.

The wind shields of different automobiles vary considerably in height, and the most convenient vertical position of the glare screen will be different for different drivers. The arms 8 of the fixed frame are therefore preferably made long enought to fit the highest wind shields, and the sliding adjustment of the frame 12 permits the screen to be adjusted to the desired height. When thus adjusted any excess length of the arms 8 which may project below the screen may be cut off if desired.

This device may be attached not only to the upper rail of a wind shield but, if desired, to the side rail, an arrangement which is preferable in the case of many types of motor trucks. When the screen is attached to the side rail the parts may obviously be changed so that the clamping lugs are at the end of the slide frame instead of opposite to its long dimension, in order to cause the screen to swing horizontally and to occupy the same position with respect to the driver, as shown in Fig. 1 of the drawing. Or, if desired, the screen may be constructed as shown in the drawing, and may be suspended from a fixed or swinging bar carried by the windshield frame or other convenient part of the vehicle.

While I have shown and described the form in which I now prefer to construct my invention, it will be understood that various changes may be made in the details of construction herein shown, without departing from my invention as set forth in the appended claims. It will also be understood that my invention is not restricted to use on automobiles and motor trucks, but is a useful attachment for any other vehicles such as street cars, locomotives, motor boats and horse-drawn vehicles.

I claim as my invention:

1. A glare screen for automobiles and other vehicles comprising a rigid frame composed of two parallel arms permanently connected by a transverse bar, ears formed integral with said frame adjacent to the junctions between said bar and said arms, lugs adapted to be secured to the rail of a wind shield, the said ears and the said lugs being provided with registering openings, a rod extending through said openings and having threaded ends provided with clamping nuts, and a frame adapted to contain a sheet of transparant material and slidably mounted on the arms of said rigid frame.

2. A glare screen for automobiles and other vehicles comprising a three-sided frame composed of a single sheet metal stamping bent to form a channel to receive a sheet of transparent material, and having integral supporting lugs and integral fingers formed at the ends of the arms of said frame and adapted to be bent along the edge of said transparent sheet for securing said transparent sheet against edgewise movement therein, a rigid frame having arms extending through said supporting lugs, and means for adjustably securing said lugs to said arms.

3. A glare screen for automobiles and other vehicles comprising a rigid frame consisting of a single metal stamping and having two parallel arms joined by a transverse bar and integral ears formed adjacent to the junctions between said arms and said bar, and a sliding frame carried by said arms and composed of a single sheet metal stamping bent to form a channel to receive a sheet of transparent material, and friction washers for connecting said sliding frame to said arms.

4. A glare screen for automobiles and other vehicles, comprising two supporting lugs each composed of a single metal stamping and having two parallel sides provided with openings to receive clamping screws, and a corrugated head extending outwardly and diagonally with respect to said parallel sides, a rigid frame having two parallel arms joined by a transverse bar and having integral lugs adjacent to the junctions between said transverse bar and said arms, said lugs being corrugated and being spaced to fit between the heads of said lugs, a rod extending through openings in said ears and in said lugs, and having threaded ends provided with clamping nuts, and a movable frame carried by the arms of said rigid frame, said movable frame being composed of a single sheet metal stamping bent to form a channel for receiving a sheet of transparent material, and having integral fingers for retaining said transparent sheet therein, said sliding frame being also provided with friction washers for adjustably supporting said frame on the arms of said rigid frame.

In testimony whereof I, the said JAMES J. JACOBS, have hereunto set my hand.

JAMES J. JACOBS.